US006392695B1

(12) United States Patent
Watamoto et al.

(10) Patent No.: US 6,392,695 B1
(45) Date of Patent: May 21, 2002

(54) IMAGE DISPLAY DEVICE (75) Inventors: Toru Watamoto, Settsu; Koichiro Nagata, Ibaraki, both of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/062,290

(22) Filed: Apr. 17, 1998

(30) Foreign Application Priority Data

Apr. 17, 1997 (JP) ............................................. 9-099915

(51) Int. Cl.⁷ ................................................. H04N 3/20
(52) U.S. Cl. ........................ 348/173; 348/377; 348/632; 348/730; 386/113; 386/125; 345/211
(58) Field of Search ................................. 348/173, 377, 348/378, 379, 380, 553, 730, 632, 633, 634, 635; 386/125, 126, 1, 45, 46, 39, 21, 96, 98, 99, 106, 113; 345/211

(56) References Cited

U.S. PATENT DOCUMENTS

| | | | | |
|---|---|---|---|---|
| 4,338,623 A | * | 7/1982 | Asmus et al. ................ 348/173 |
| 4,677,351 A | * | 6/1987 | Brust et al. .................. 315/386 |
| 4,677,430 A | * | 6/1987 | Falkman et al. ............. 345/121 |
| 5,448,262 A | * | 9/1995 | Lee et al. .................... 345/212 |
| 5,496,178 A | * | 3/1996 | Back ........................ 434/307 A |
| 5,646,699 A | * | 7/1997 | Oh et al. ..................... 348/553 |
| 5,787,259 A | * | 7/1998 | Haroun et al. ............... 709/253 |
| 5,805,151 A | * | 9/1998 | Hwang ........................ 345/213 |
| 5,883,621 A | * | 3/1999 | Iwamura ...................... 345/327 |
| 5,966,691 A | * | 10/1999 | Kibre et al. ................. 704/260 |
| 6,002,427 A | * | 12/1999 | Kipust ......................... 348/156 |
| 6,008,842 A | * | 12/1999 | Nagata ......................... 348/173 |

FOREIGN PATENT DOCUMENTS

| EP | 0822717 | 2/1998 |
|---|---|---|
| GB | 2286917 | 8/1995 |
| JP | 63-131666 | 6/1988 |
| JP | 5-103277 | 4/1993 |

* cited by examiner

*Primary Examiner*—Andrew I. Faile
*Assistant Examiner*—Habte Bahgi
(74) *Attorney, Agent, or Firm*—Ratner & Prestia (57) ABSTRACT

An image display device having (a) a DVD or a CD, (b) a television receiver, (c) a display for displaying an image from the DVD and the television receiver, (d) a screen burn-in preventer, and (e) a deterioration protector for protecting the display device from deterioration. The screen burn-in preventer discontinues reproduction from the DVD when an image reproduced of the DVD becomes stationary, and the stationary state continues for the predetermined time period. The deterioration protector discontinues reproduction from the DVD at a second predetermined time after the television receiver is turned on while an image reproduced from the DVD is displayed by the display.

15 Claims, 5 Drawing Sheets

IMAGE DISPLAY DEVICE

TECHNICAL FIELD OF THE INVENTION

The present invention relates to an image display device for reproducing an image or sound recorded by a recording medium such as a digital video disc (DVD) and a compact disc (CD), and displaying an image from a television receiver (TV).

BACKGROUND OF THE INVENTION

Conventionally, in an integrated DVD and television receiver, with a DVD incorporated therein, even when a stationary image or a DVD menu screen is displayed, the stationary image or the DVD menu screen is continuously displayed on an image screen until a user cancels the stationary mode, or selects a cursor in the other menu.

In addition, because a power supply to the DVD deck is linked with that of the TV, whenever the power supply to TV is turned on, the power supply to the DVD deck is also turned on.

In such conventional constitution, burn-in of a screen is caused when an image without any motion, such as a stationary image or a DVD menu screen is, displayed for a long time. Even when a user watches a TV picture without using the DVD deck, the power supply to the DVD deck is in the "ON" state, and therefore the DVD deck deteriorates in a shorter time.

SUMMARY OF THE INVENTION

An image display device according to the invention comprises:
 (a) first image and sound reproducing means for reproducing at least one of a first image and a first sound;
 (b) second image and sound reproducing means for reproducing a second image;
 (c) a display means for displaying the first and second images; and
 (d) at least one deterioration preventing means including:
  (1) screen burn preventing means for preventing burn-in of a screen of the display means, when a stationary image based on the first and second images is displayed in the screen of the display means for at least a predetermined time; and
  (2) protective means for protecting the first image and sound reproducing means against deterioration.

It may be preferable that the first image and sound reproducing means is at least one selected from a group consisting of a DVD deck, a VIDEO-CD and a CD.

It may be preferable that the second image and sound reproducing means is a television receiver (TV).

It may also be preferable that the display means is a cathode-ray tube, a liquid crystal display device or a plasma display device.

According to the above constitution, a stationary image is prevented from being displayed for a long time, hence burn-in of the screen of the display means may be prevented.

Further, when the second image is displayed by the display means, the first image and sound reproducing means is protected, and deterioration of the first image and sound reproducing means may be prevented.

DETAILED DESCRIPTION OF THE INVENTION

An image display device according to a first exemplary embodiment of the present invention comprises a DVD deck provided as a first image and sound reproducing means, a television receiver provided as a second image and sound reproducing means and an image display means such as a cathode tube. The display device further comprises means for preventing burn-in of a screen that may be caused when a stationary image is displayed for a long period of time on the image display means and means for protecting the DVD deck when the DVD deck is not used. Because of the constitution, an effect of preventing burn-in in of a screen and protecting the DVD deck may be provided. An image display device according to a second exemplary embodiment of the present invention comprises, in addition to above-described constitution, means for bringing a disc, such as a DVD, a VIDEO-CD, or CD, to a halt when the disc is maintained in a stationary or paused state for a predetermined period of time during reproduction. As a result, burn-in of a screen caused when an image is maintained in a stationary or paused state for a long time may be prevented.

An image display device according to a third exemplary embodiment of the present invention comprises, in addition to above-described constitution, includes means for discontinuing reproduction from a disc, when a reproducing state of displaying a DVD disc menu is maintained for a predetermined period of time. According to the constitution, burn-in of a screen caused when a DVD disc menu is continuously displayed for a long time may be prevented.

An image display device according to a fourth exemplary embodiment of the present invention comprises means for discontinuing reproduction of a disc when an input image is switched to a non-DVD input during reproduction of the disc, and such state is maintained for a predetermined period of time. As a result of the constitution, an effect of discontinuing reproduction from a disc when the user doesn't use the DVD deck, and preventing the DVD deck from deteriorating in a short time may be obtained.

An image display device according to still another exemplary embodiment of the present invention comprises warning means for displaying a warning message (OSD) on a screen at a predetermined time before reproduction from a disc is discontinued. Because of the constitution, an effect of giving notice of discontinuation of reproduction of the disc to a user may be obtained.

An image display device according to a further exemplary embodiment of the present invention comprises means for tuning off a power supply to a deck when a disc of the deck is maintained in a halt state for a predetermined period of time. According to the constitution, an effect of protecting the DVD deck by turning off the power supply to the deck when the DVD deck is not used may be obtained.

An image display device according to yet a further exemplary embodiment of the present invention comprises means for turning off a power supply to a deck when a disc of the deck is maintained in a state waiting for further reproduction for a predetermined period of time. As a result of the constitution, an effect of protecting the DVD deck by turning off the power supply to the deck when the DVD deck is not used may be obtained.

An image display device according to still a further exemplary embodiment of the present invention comprises warning means for giving a warning to a user by displaying an OSD on a screen a predetermined time before the power supply to the deck is turned off. Because of the constitution, an effect of giving a notice of disconnection of the power supply to the deck to a user may be obtained.

An image display device according to another embodiment of the present invention comprises means for turning on a power supply to a deck when an input for reproduction of DVD or opening/closure of a tray is made such that the power supply to the deck is turned off. As a result of the constitution, when a power supply to the TV is turned on, and the power supply to the DVD deck is turned off, the power to the DVD deck is turned on when a user wants to use the DVD deck.

An image display device according to still another embodiment of the invention comprises means for notifying a user that a CD is presently in reproduction by displaying an OSD on a screen. According to the constitution, an effect of notifying a user that the CD is presently in reproduction even though no image is contained on the CD may be obtained.

An image display device according to a further embodiment of the present invention comprises means for changing the location or a time of an OSD notifying the user that the CD is in reproduction. As a result of the constitution, an effect of preventing burn-in of a screen may be obtained.

An image display device according to still a further exemplary embodiment of the invention comprises means for lowering an image adjustment value of a screen when a CD is maintained in a reproducing state for a predetermined period of time. As a result of the constitution, an effect of preventing burn-in of a screen by reducing an output image may be obtained when a CD is maintained in a reproducing state for a long time.

An image display device according to another embodiment of the present invention comprises means for returning an image adjustment value to an original value when an input is made by a user such that the image adjustment value of a screen is lowered during reproduction of a CD. According to the constitution, an effect of returning an image adjustment value to an original value for TV viewing when a user wants to watch a TV picture may be obtained.

Exemplary embodiments of the invention are now described below by referring to the drawings.

Embodiment 1

An image display device according to the first exemplary embodiment comprises a DVD deck, a television receiver (TV) and display means contained in a casing.

Figure 1:
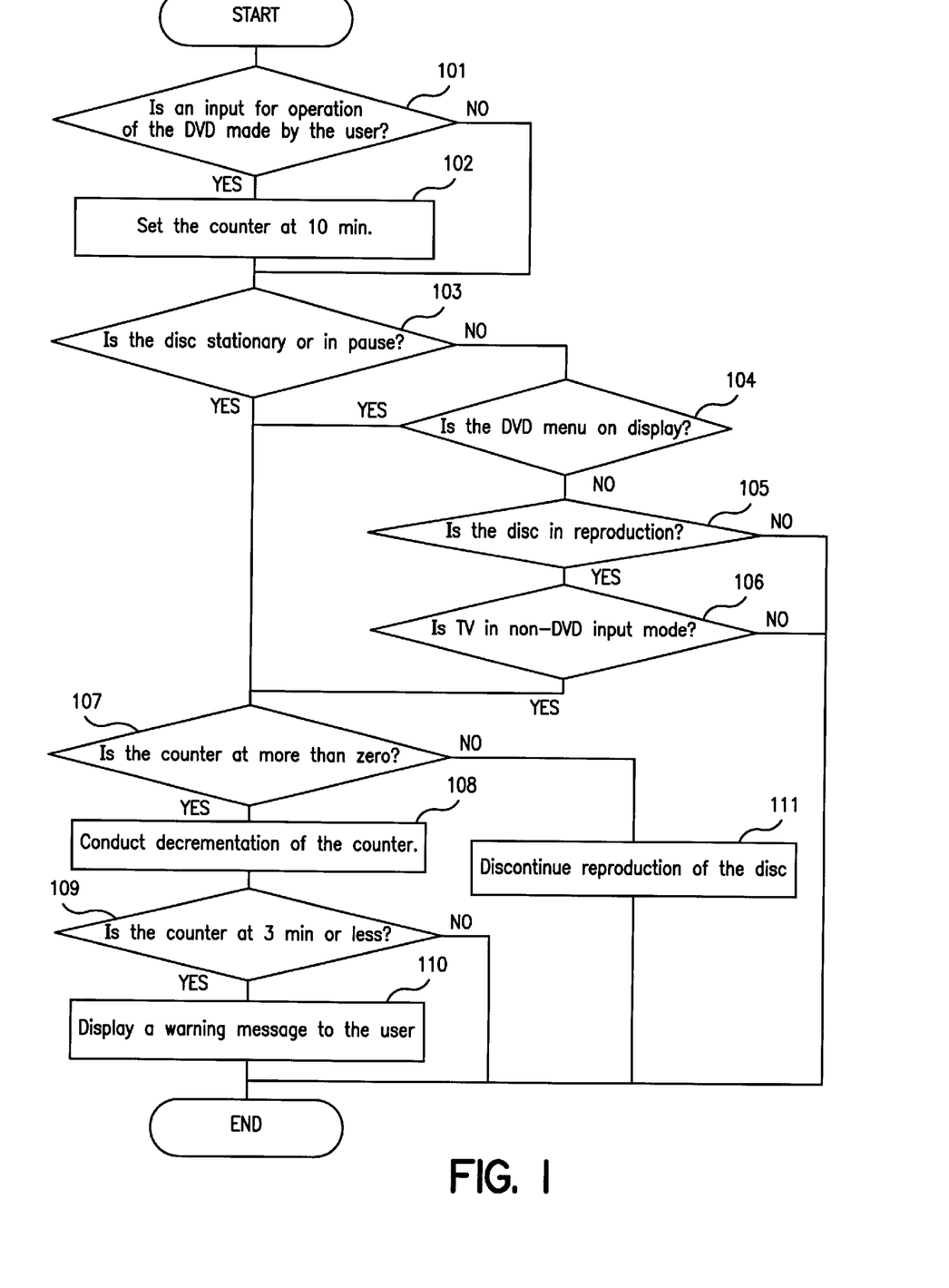
FIG. 1 is a flowchart of a software structure according to a first exemplary embodiment of the present invention.

FIG. 1 shows a flowchart of an operating procedure for preventing burn-in of a screen in image display means that comprises a DVD deck with a disc, a TV receiver, image display means and screen burn-in preventing means.

In FIG. 1, step 101 is a branch for determining whether an input for operation of the DVD is made by a user.

Step 102 is a step of setting the counter to a certain time.

Step 103 is a branch for determining whether the disc is in a stationary state or in a paused state.

Step 104 is a branch for determining whether the DVD menu is on the display.

Step 105 is a branch for determining whether the disc is being reproduced.

Step 106 is a branch for determining whether the TV is currently in a non-DVD input mode.

Step 107 is a branch for determining whether the counter is greater than zero.

Step 108 is a step for decrementing the counter.

Step 109 is a branch for determining whether the counter is at a warning OSD display time or less.

Step 110 is a step of displaying a warning message to the user.

Step 111 is a step for instructing discontinuation of reproduction from the disc.

Herein, OSD stands for on-screen display.

Operation of the screen burn-in preventing means constituted as above is described below.

In FIG. 1, when an input for any operation of a DVD is made by the user at step 101, the counter is set at a value of 10 min, for example, at step 102.

According to the constitution, when the disc is rendered stationary, or display of the DVD menu is instructed by the user, the counter is set at the predetermined time.

When the counter is not at zero at step 107, decrementation of the counter is conducted at step 108. Therefore, time is accurately counted to 10 min after operation of the DVD by the user.

If the disk is stationary or paused at step 103, the DVD menu is on the display at step 104, or the disc is in reproduction when the TV is in the non-DVD mode (the user is not watching a DVD image) at step 106, the steps step 107 and 111 are processed, and the counter and deck are controlled.

In the event the counter is greater than "zero" at step 107, the counter is decremented at step 108, and the user is informed at step 110 that the DVD will be turned off soon when the counter is at 3 min or less time, for example, at step 109.

When the counter is at "zero" at step 107 (the disc is maintained in a stationary state for the exemplary 10 min), reproduction from the disc is discontinued at step 111.

As a result of above-described process, burn-in of a screen caused by a motionless image, such as a stationary image or a menu screen that is maintained for a long period of time is avoided, and reduction in the quality of the DVD deck may be prevented as reproduction of the disk is discontinued when it is not used by the user.

Embodiment 2

Figure 2:
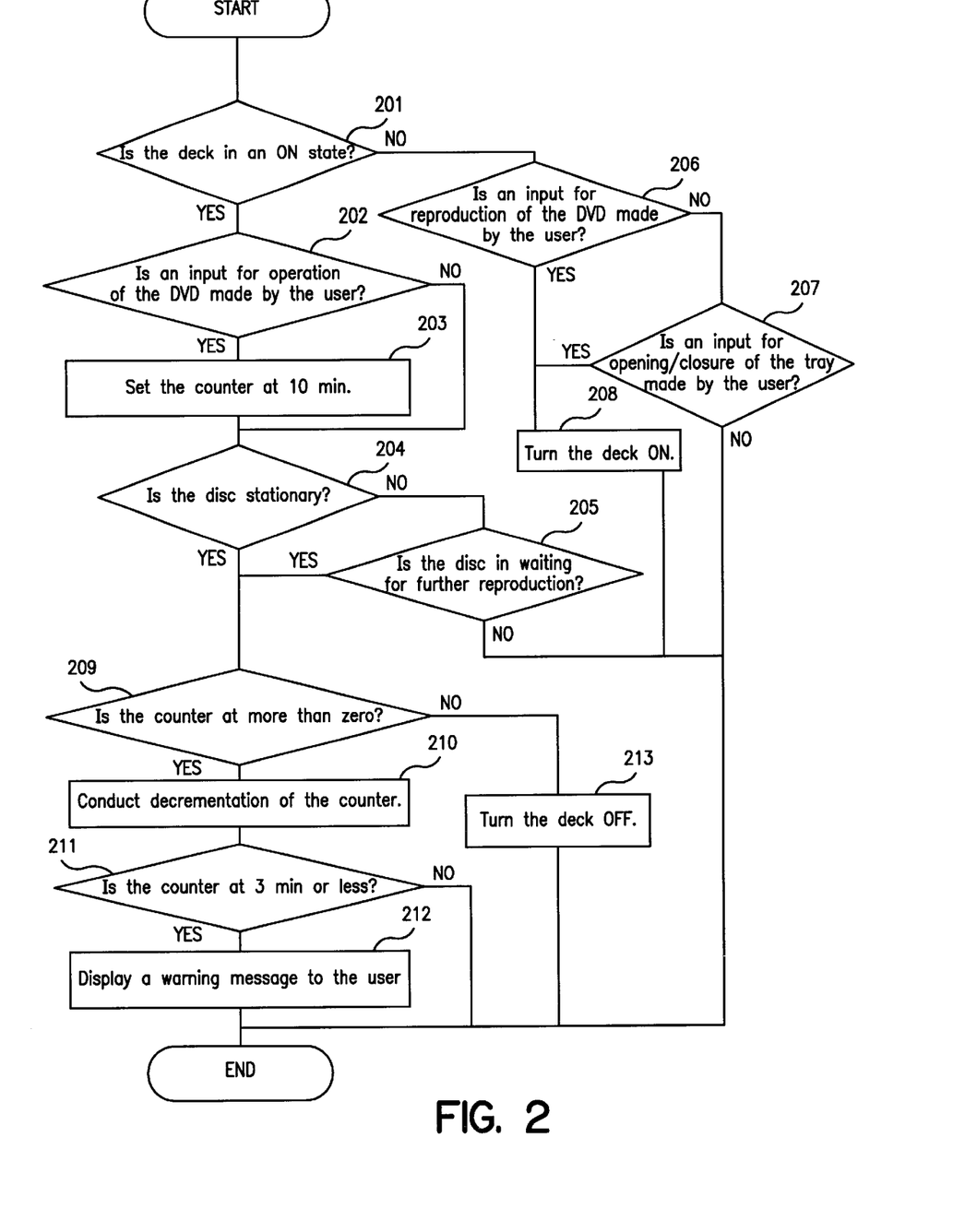
FIG. 2 is a flowchart of software structure according to a second exemplary embodiment of the present invention.

FIG. 2 shows a flowchart of an operating procedure for protecting a DVD deck in an image display device that comprises the DVD deck with a disc, a TV receiver, image display means and protective means.

In FIG. 2, step 201 is a branch for determining whether the power supply to the deck is presently in the "ON" state or not.

Step 202 is a branch for determining whether an input for operation of the DVD is made by the user.

Step 203 is a step for determining setting the counter at a specified time.

Step 204 is a branch for determining whether the disc is stationary.

Step 205 is a branch for determining whether the disc is waiting for further reproduction.

Step 206 is a branch for determining whether an input for reproduction of the DVD is made by the user.

Step 207 is a branch for determining whether opening/closure of the tray is requested by the user.

Step 208 is a step to activate the power supply to the deck.

Step 209 is a branch for determining whether the counter is greater than zero.

Step 210 is a step to decrement the counter.

Step 211 is a branch for determining whether the counter is at a time to display the OSD warning.

Step 212 is a step for displaying a warning message to the user.

Step 213 is a step to instruct the turning "OFF" of the power supply to the deck.

Operation of the deck protecting means constituted as above is described below.

In FIG. 2, it is determined at step 201 whether the power supply to the deck is presently in the "ON" state. When the power supply to the deck is in the "OFF" state, an input for reproduction of the DVD is made by the user (at step 206), or opening/closure of the tray is requested by an input from the user (at step 207), the power supply to the deck is turned on at step 208.

When the deck is in the "ON" state at step 201, if an input for any operation of the DVD is made by the user at step 202, the counter is set at a value of 10 min, for example, at step 203.

According to such constitution, as soon as the disc is discontinued from reproduction by the user, or brought into a state of waiting for further reproduction, the setting of the time occurs.

When the counter is not at "zero" at step 209, decrementation of the counter is conducted at step 210. As a result, time is accurately counted to 10 min after operation of the DVD by the user.

When the disc is in a non-operating state (at step 204), or a state of waiting for further reproduction (at step 205), the steps shown at steps 209 and 213 are processed, and the counter and deck are controlled.

When the counter is greater than "zero" at step 209, decrementation of the counter is made at step 210, and the user is informed, at step 212, that the power supply to the deck will soon be turned "OFF" when the counter is at 3 min or less time at step 211.

When the counter is at "zero" at step 209 (the disc is maintained in the non-operating state or state of waiting for further reproduction for 10 min), the power supply to the deck is turned "OFF" at step 213.

According to above-described constitution, if the deck is not used by the user for a period of time, the power supply to the deck is turned "OFF" so that it is protected from rapid deterioration in quality.

Embodiment 3

Figure 3:
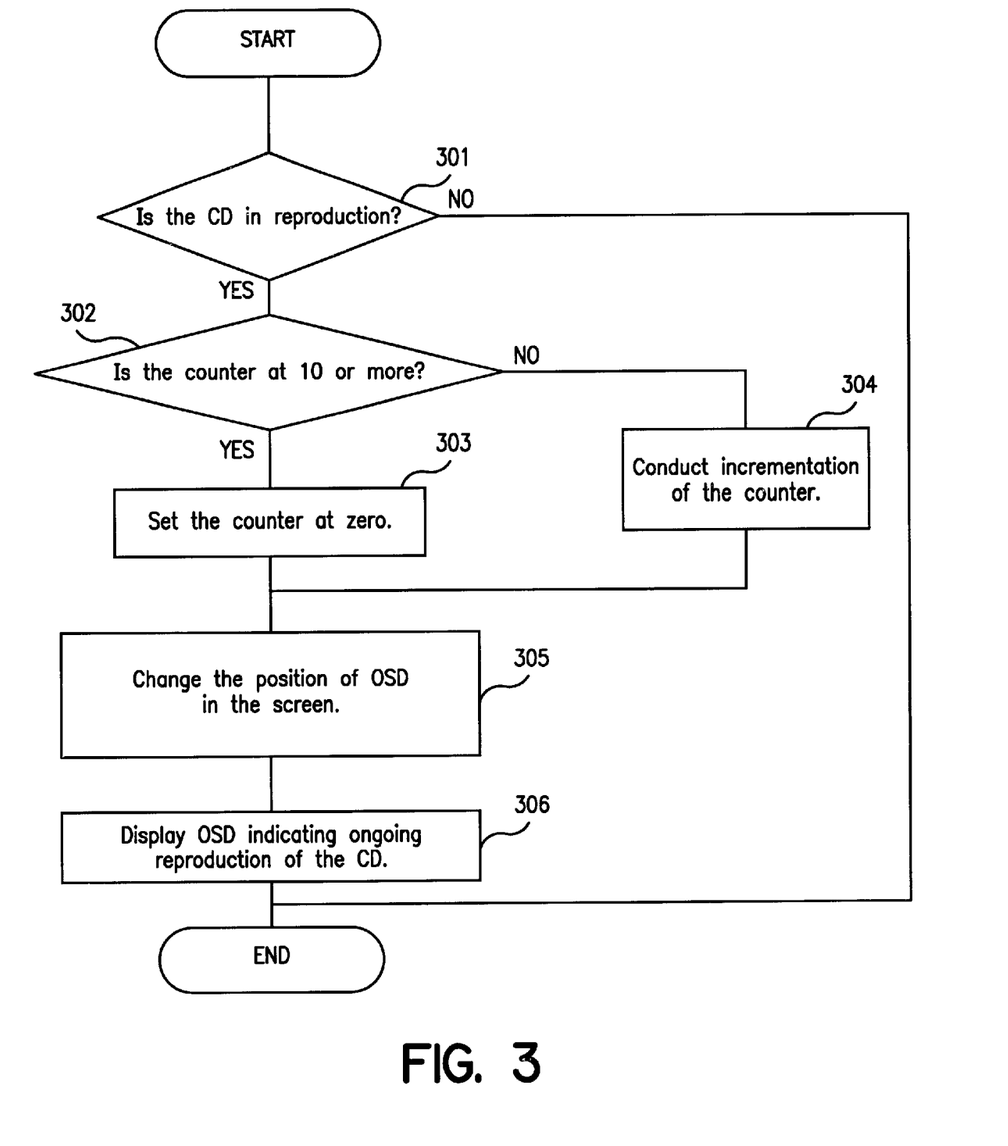
FIG. 3 is a flowchart of software structure according to a third exemplary embodiment of the present invention.

FIG. 3 shows a flowchart of an operating procedure for preventing burn-in of a screen in an image display means that comprises a CD deck, a TV receiver, image display means and screen burn-in preventing means.

In FIG. 3, step 301 is a branch for determining whether the CD is in a reproduction state.

Step 302 is a branch for determining whether the counter is at "10" or more for example.

Step 303 is a step of setting the counter to "zero".

Step 304 is a step for incrementing the counter.

Step 305 is a step for changing an OSD display position.

Step 306 is a step of displaying an OSD (warning message) for indicating the CD is in a reproduction mode.

An operation for preventing screen burn-in due to display of the OSD message that indicates that the CD is in a reproduction mode according to above constitution is described.

In FIG. 3, when the CD is in the reproduction mode at step 301, if the counter is at "10" or more, for example, at step 302, the counter is set to "zero" to step 303. Then, the display position of the OSD is changed according to a value of the counter at step 305, and the OSD, indicating that the CD is now in a reproduction mode, is displayed at step 306.

As a result of the above process, the user is informed that the CD is in a reproduction mode and, therefore, an image is not displayed.

Burn-in of a screen due to display of the OSD for a long time during reproduction of the CD, may be prevented by changing a display position of the OSD.

Embodiment 4

Figure 4:
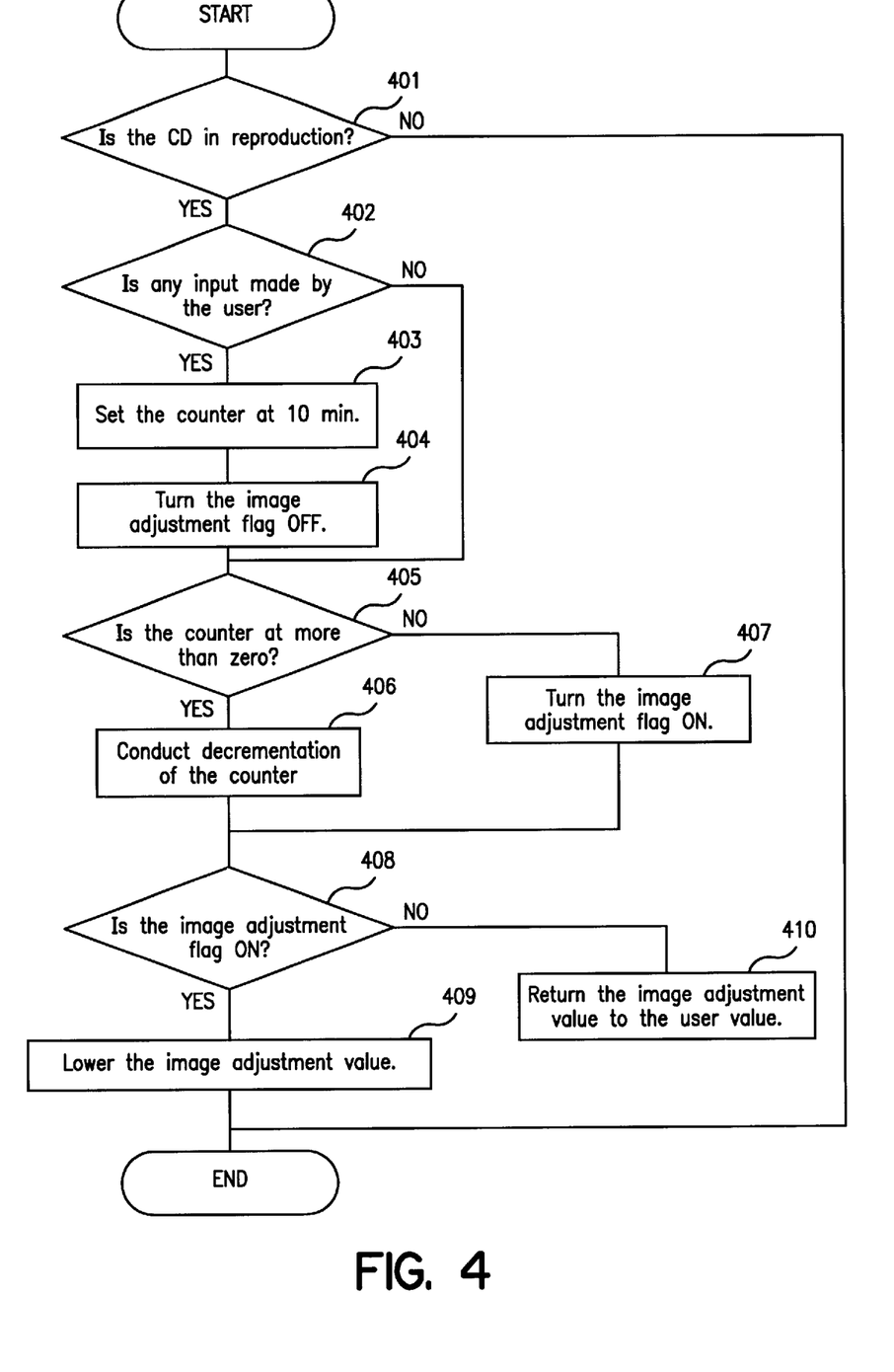
FIG. 4 is a flowchart of software structure according to a forth exemplary embodiment of the present invention.

FIG. 4 shows a flowchart of an operating procedure for preventing screen burn-in, due to image adjustment during reproduction of a CD, in an image display means that comprises a CD deck, a TV receiver, image display means and screen burn-in preventing means.

In FIG. 4, step 401 is a branch for determining whether the CD is presently in a reproduction mode.

Step 402 is a branch for determining whether any input is made by the user.

Step 403 is a step for setting the counter to a predetermined time.

Step 404 is a step to instruct the turning "OFF" of an image adjustment flag.

Step 405 is a branch for determining whether the counter is greater than "zero".

Step 406 is a step to decrement the counter.

Step 407 is a step to instruct the turning on the image adjustment flag.

Step 408 is a branch for determining whether the image adjustment flag is in the "ON" state.

Step 409 is a step to instruct the changing of an image adjustment value.

Step 410 is a step to instruct the return of the image adjustment value to the user value.

An operation of preventing screen burn due to image adjustment during reproduction of the CD according to above constitution is described.

In FIG. 4, when the CD is in a reproduction mode at step 401, if any input is made by the user at step 402, the counter is set to a value of 10 min, for example, at step 403, and the image adjustment flag is turned OFF at step 404.

As a result of the above process, as soon as any input is made by the user, setting of the time is conducted and decrementation of the counter is performed at step 406 when the counter is not "zero" at step 405.

The counter is decremented at step 406 when the counter is greater than "zero" at step 405. The image adjustment flag is turned on at step 407 when the counter is at "zero" (no input has been made by the user for a period of 10 min).

Then, the image adjustment value is reduced from the current user value at step 409, when the image adjustment flag is "ON" at step 408, and the image adjustment value is returned to the original user value at step 410 when the image adjustment flag is "OFF" at step 408.

As a result of above process, the image adjustment value is reduced when the CD is reproduced continuously for 10 min or more, because a TV picture is not important to the user during reproduction of the CD. In this way, screen burn-in due to the display of an OSD indicating the CD is in a reproduction mode and that of a DVD input mode screen, may be prevented.

Additionally, in the event that any input is made by the user during reproduction of the CD, since a TV picture may be of importance to the user, the image adjustment value is returned to the original value.

In the embodiment, a DVD-CD may be employed alternatively to that of a DVD and a CD, and an effect similar to that described above may be obtained.

As described above, according to the invention, in a television receiver with a DVD deck incorporated therein, reproduction of a disc is discontinued when a motionless image is continuously displayed in a screen for a long period of time.

In a television receiver with a CD deck incorporated therein, during reproduction of a CD, the position of an OSD is changed, or the image adjustment value is lowered.

As a result, burn-in of a screen may be prevented.

Further, when the DVD deck or CD deck is not used by the user for a time, the power supply to the deck is turned "OFF" so that it is protected from rapid reduction in quality.

In the invention, as the display means, a cathode ray tube (CRT), a liquid crystal display device (LCD), a plasma display device or the like may be employed.

Figure 5:
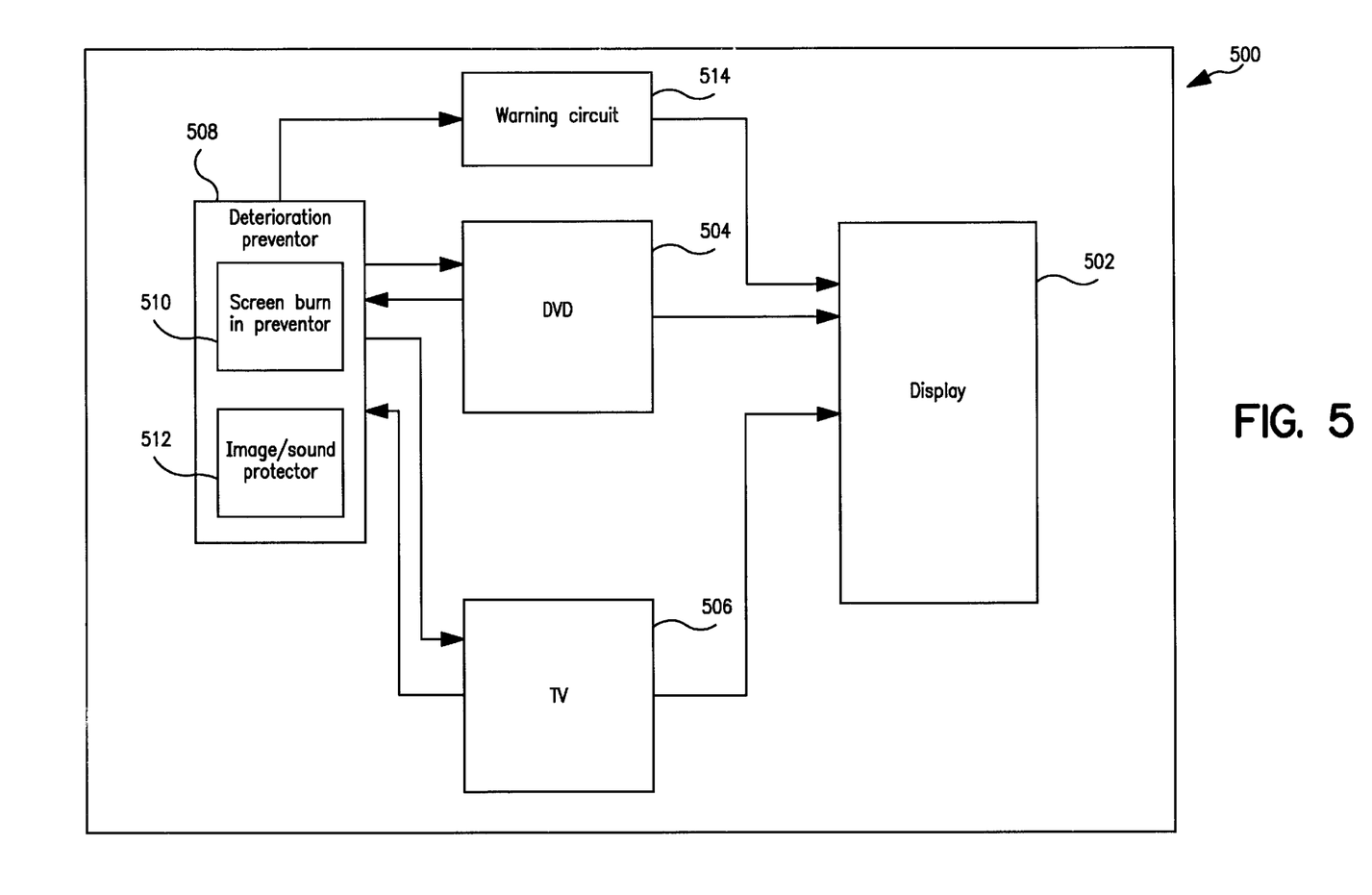
FIG. 5 is a block diagram of an exemplary embodiment of the present invention.

Referring to FIG. 5, a block diagram of an exemplary embodiment of image display device 500 is shown. In FIG. 5 a DVD, CD, or VIDEO-CD 504, for example, is connected to display unit 502. A TV 506, for example is also connected to display 502. DVD 505 and TV 506 are connected to deterioration preventor 508. Deterioration preventor 508 receives information from DVD 504 and TV 506 and generates control signals to each. Deterioration preventor 508 may contain either one or both of a screen burn-in preventor 510 and an image and sound deterioration preventor 512. The deterioration preventor may also be connected to a warning circuit 514 that generates the OSD warning described above to display 502.

In the exemplary embodiment of an image display device 500 according to the invention, although an image display device 500 comprising a DVD deck 504 or a CD, a television receiver 506 and display means 502 that are provided in a case has been described, it may be constituted such that at least one of the DVD deck, CD, television receiver and display means are separate from one another, and the devices are mutually connected by electrical connection means such as connecting wire.

In such constitution, an effect similar to that described above may be obtained.

What is claimed is:

1. An image display device comprising:
image and sound reproducing means for reproducing at least one of an image and sound wherein said image and sound reproducing means includes,
first image and sound reproducing means for reproducing one of a first image and a first sound;
second image and sound reproducing means for reproducing a second image and a second sound;
display means for displaying a selected one of said first or second image;
deterioration prevention means for,
preventing deterioration of said image and sound reproducing means by selectively providing power to said image and sound reproducing means based on a signal source of said display means;
preventing burn-in of a screen of said display means, when a stationary image is displayed on the screen of said display means for at least a first predetermined time;
deactivating said first image and sound reproducing means at a second predetermined time after said second image and sound reproducing device is activated while said first image is displayed by said display means;
wherein said first image and sound reproducing means reproduces only said first sound;
said deterioration prevention means having an image adjusting means for adjusting a condition of an image on the screen;
said image adjusting means controls an image adjustment value for said second image;
said image adjusting means provides at least one of a function,
to reduce the image adjustment value for said second image when said first sound is reproduced for at least a third predetermined time, and
to return said image adjustment value to an original value when i) said first sound is continuously reproduced, and ii) said image adjustment value for said second image is concurrently in a reduced state.

2. An image display device comprising:
image and sound reproducing means for reproducing at least one of an image and sound, said image and sound reproducing means including first image and sound reproducing means for reproducing one of a first image and a first sound and second image and sound reproducing means for reproducing a second image and a second sound;
display means for displaying a selected one of said first image or second image;
deterioration prevention means for preventing deterioration of said image and sound reproducing means by selectively providing power to said image and sound reproducing means based on a signal source of said display means, said deterioration prevention means including a protective means for protecting said image and sound reproducing means from deterioration;
a warning display means which displays a warning on said display means at a first predetermined time before reproduction from said image and sound is reproducing means is discontinued;
wherein said protective means discontinues reproduction of said first image and sound reproducing means at said first predetermined time after said warning is displayed;
wherein said first image and sound reproducing means reproduces only said first sound;
said deterioration prevention means having an image adjusting means for adjusting a condition of an image on the screen;
said image adjusting means controls an image adjustment value for said second image;
said image adjusting means provides at least one of a function, to reduce the image adjustment value for said second image when said first sound is reproduced for at least a second predetermined time, and to return said image adjustment value to an original value when i) said first sound is continuously reproduced, and ii) said image adjustment value for said second image is concurrently in a reduced state.

3. An image display comprising:

image and sound reproducing means for reproducing at least one of an image and sound, said image and sound reproducing means including first image and sound reproducing means for reproducing one of a first image and a first sound; and second image and sound reproducing means for reproducing a second image and a second sound;

display means for displaying a selected one of said first or second image;

deterioration prevention means for preventing deterioration of said image and sound reproducing means by selectively providing power to said image and sound reproducing means based on a signal source of said display means, said deterioration preventing means including a protective means for protecting said image and sound reproducing means from deterioration;

wherein said protective means deactivates said first image and sound reproducing means when reproduction of said first image and sound reproducing means is paused for at least a first predetermined time;

wherein said first image and sound reproducing means reproduces only said first sound;

said deterioration prevention means having an image adjusting means for adjusting a condition of an image on the screen;

said image adjusting means controls an image adjustment value for said second image;

said image adjusting means provides at least one of a function, to reduce the image adjustment value for said second image when said first sound is reproduced for at least a second predetermined time, and to return said image adjustment value to an original value when i) said first sound is continuously reproduced, and ii) said image adjustment value for said second image is concurrently in a reduced state.

4. An image display device comprising:

image and sound reproducing means for reproducing at least one of an image and sound, wherein said image and sound reproducing means includes first image and sound reproducing means for reproducing one of a first image and a first sound and second image and sound reproducing means for reproducing a second image and a second sound;

display means for displaying a selected one of said first or second image;

deterioration prevention means for preventing deterioration of said image and sound reproducing means by selectively providing power to said image and sound reproducing means based on a signal source of said display means said deterioration prevention means including a protective means for protecting said image and sound reproducing means from deterioration;

wherein said protective means deactivates said first image and sound reproducing means when said first image and sound reproducing means is in a reproducing mode, and is maintained in a waiting state for further reproduction for at least a first predetermined time;

wherein said first image and sound reproducing means reproduces only said first sound;

said deterioration prevention means having an image adjusting means for adjusting a condition of an image on the screen;

said image adjusting means controls an image adjustment value for said second image;

said image adjusting means provides at least one of a function, to reduce the image adjustment value for said second image when said first sound is reproduced for at least a second predetermined time, and to return said image adjustment value to an original value when i) said first sound is continuously reproduced, and ii) said image adjustment value for said second image is concurrently in a reduced state.

5. An image display device comprising:

image and sound reproducing means for reproducing at least one of an image and sound, said image and sound reproducing means includes first image and sound reproducing means for reproducing one of a first image and a first sound and second image and sound reproducing means for reproducing a second image and a second sound;

display means for displaying a selected one of said first or second image;

deterioration prevention means for preventing deterioration of said image and sound reproducing means by selectively providing power to said image and sound reproducing means based on a signal source of said display means, said deterioration preventing means including a protective means for protecting said image and sound reproducing means from deterioration;

warning display means;

wherein said warning displaying means displays a warning on said display means at a first predetermined time before said first image and second reproducing means is deactivated;

said protective means deactivates said first image and sound reproducing means at said first predetermined time after said warning is displayed;

wherein said first image and sound reproducing means reproduces only said first sound;

said deterioration prevention means is provided with image adjusting means for adjusting a condition of an image on the screen;

said image adjusting means controls an image adjustment value for said second image and;

said image adjusting means provides at least one of a function, to reduce the image adjustment value for said second image when said first sound is reproduced for at least a second predetermined time, and to return said image adjustment value to an original value when i) said first sound is continuously reproduced, and ii) said image adjustment value for said second image is concurrently in a reduced state.

6. An image display device comprising:

image and sound reproducing means for reproducing at least one of an image and sound, said image and sound reproducing means includes first image and sound reproducing means for reproducing one of a first image and a first sound and second image and sound reproducing means for reproducing a second image;

display means for displaying a selected one of said first or second image;

deterioration prevention means for preventing deterioration of said image and sound reproducing means by selectively providing power to said image and sound reproducing means based on a signal source of said display means said deterioration preventing means including a protective means for protecting said image and sound reproducing means from deterioration;

wherein said protective means activates said first image and sound reproducing means based on at least one of,
 (1) the reception of a first input signal for activating a power switch of said first image and sound reproducing means;
 (2) the reception of a second input signal for operating a media interface of said first image and sound reproducing means, when said first image and sound reproducing means is in a deactivated state;

wherein said first image and sound reproducing means reproduces only said first sound;

said deterioration prevention means is provided with image adjusting means for adjusting a condition of an image on the screen;

said image adjusting means controls an image adjustment value for said second image;

said image adjusting means provides at least one of a function, to reduce the image adjustment value for said second image when said first sound is reproduced for at least a second predetermined time, and to return said image adjustment value to an original value when i) said first sound is continuously reproduced, and ii) said image adjustment value for said second image is concurrently in a reduced state.

7. An image display device comprising:

image and sound reproducing means for reproducing at least one of an image and sound, said image and sound reproducing means includes first image and sound reproducing means for reproducing one of a first image and a first sound; and second image and sound reproducing means for reproducing a second image and a second sound;

display means for displaying a selected one of said first or second image;

deterioration prevention means for preventing deterioration of said image and sound reproducing means by selectively providing power to said image and sound reproducing means based on a signal source of said display means;

said display means includes an on-screen display means, wherein said first image and sound reproducing means reproduces only said first sound;

said on-screen display means displays an image on said display means that indicates ongoing reproduction of said first sound when said first sound is reproduced;

said deterioration prevention means is provided with image adjusting means for adjusting a condition of an image on the screen;

said image adjusting means controls an image adjustment value for said second image;

said image adjusting means provides at least one of a function, to reduce the image adjustment value for said second image when said first sound is reproduced for at least a first predetermined time, and to return said image adjustment value to an original value when i) said first sound is continuously reproduced, and ii) said image adjustment value for said second image is concurrently in a reduced state.

8. An image display device comprising:

image and sound reproducing means for reproducing at least one of an image and sound, said image and sound reproducing means includes first image and sound reproducing means for reproducing one of a first image and a first sound and second image and sound reproducing means for reproducing a second image and a second sound;

display means for displaying a selected one of said first image or second image;

deterioration prevention means for preventing deterioration of said image and sound reproducing means by selectively providing power to said image and sound reproducing means based on a signal source of said display means said deterioration prevention means including a screen burn-in prevention means to prevent burn-in of a screen of said display means, when a stationary image is displayed on the screen of said display means for at least a first predetermined time, said display means including an on-screen display means, wherein said first image and sound reproducing means reproduces said first sound;

said on-screen display means i) displays a warning that indicates ongoing reproduction of said first sound when said first sound is reproduced, and ii) changes a position of said warning at a periodic time interval;

wherein said first image and sound reproducing means reproduces only said first sound;

said screen burn-in preventing means is provided with image adjusting means for adjusting a condition of an image on the screen;

said image adjusting means controls an image adjustment value for said second image;

said image adjusting means provides at least one of a function, to reduce the image adjustment value for said second image when said first sound is reproduced for at least a second predetermined time, and to return said image adjustment value to an original value when i) said first sound is continuously reproduced, and ii) said image adjustment value for said second image is concurrently in a reduced state.

9. An image display device comprising:

image and sound reproducing means for reproducing at least one of an image and sound, said image and sound reproducing means includes first image and sound reproducing means for reproducing one of a first image and a first sound and second image and sound reproducing means for reproducing a second image and a second source;

display means for displaying a selected one of said first or second image;

deterioration prevention means for preventing deterioration of said image and sound reproducing means by selectively providing power to said image and sound reproducing means based on a signal source of said display means wherein said deterioration prevention means includes a screen burn-in preventing means to prevent burn-in of a screen of said display means, when a stationary image is displayed on the screen of said display means for at least a first predetermined time;

wherein said first image and sound reproducing means reproduces only said first sound;

said screen burn-in prevention means including an image adjusting means for adjusting a condition of an image on the screen;

said image adjusting means controls an image adjustment value for said second image;

said image adjusting means provides at least one of a function, to reduce the image adjustment value for said second image when said first sound is reproduced for at least a second predetermined time, and to return said image adjustment value to an original value when i) said first sound is continuously reproduced, and ii) said image adjustment value for said second image is concurrently in a reduced state.

10. An image display device comprising:

image and sound reproducing means for reproducing at least one of an image and sound; said image and sound reproducing means includes first image and sound reproducing means for reproducing one of a first image and a first sound; and second image and sound reproducing means for reproducing a second image and a second sound;

display means for displaying a selected one of said first or second image;

deterioration prevention means for preventing deterioration of said image and sound reproducing means by selectively providing power to said image and sound reproducing means based on a signal source of said display means; wherein said deterioratoin prevention means includes a screen burn-in prevention means to prevent burn-in of a screen of said display means, when a stationary image displayed corresponding to said image is displayed on the screen of said display means for at least a first predetermined time;

wherein said first image and sound reproducing means reproduces only said first sound;

said screen burn-in preventing means is provided with image adjusting means for adjusting a condition of an image on the screen;

said image adjusting means controls an image adjustment value for said second image;

wherein said image adjusting means reduces the image adjustment value for said second image when said first sound is reproduced for at least a second predetermined time.

11. An image display means comprising:

image and sound reproducing means for reproducing at least one of an image and sound, said image and sound reproducing means includes first image and sound reproducing means for reproducing one of a first image and a first sound and second image and sound reproducing means for reproducing a second image and a second sound;

display means for displaying a selected one of said first or second image;

deterioration prevention means for preventing deterioration of said image and sound reproducing means by selectively providing power to said image and sound reproducing means based on a signal source of said display means wherein said deterioration prevention means includes a screen burn-in prevention means to prevent burn-in of a screen of said display means, when a stationary image is displayed on the screen of said display means for at least a predetermined time;

wherein said first image and sound reproducing means reproduces only said first sound;

said screen burn-in prevention means is provided with image adjusting means for adjusting a condition of an image on the screen;

said image adjusting means controls an image adjustment value for said second image;

wherein said image adjusting means returns said image adjustment value to an original value when i) said first sound is continuously reproduced, and ii) said image adjustment value for said second image is concurrently in a reduced state.

12. An image display device comprising:

image and sound reproducing means for reproducing at least one of an image and sound, said image and sound reproducing means includes first image and sound reproducing means for reproducing one of a first image and a first sound and second image and sound reproducing means for reproducing a second image and a second sound;

display means for displaying a selected one of said first or second image;

deterioration prevention means for preventing deterioration of said image and sound reproducing means by selectively providing power to said image and sound reproducing means based on a signal source of said display means;

wherein said first image and sound reproducing means is a digital versatile disk (DVD) player;

said second image and sound reproducing means is a television receiver;

said screen burn-in prevention means provides at least one of a function to,
  (1) discontinues reproduction of said first image and sound reproducing means;
  (2) deactivate said first image and sound reproducing means,
when said first image remains unchanged for at least a first predetermined time;

wherein said first image and sound reproducing means reproduces only said first sound;

said screen burn-in prevention means is provided with image adjusting means for adjusting a condition of an image on the screen;

said image adjusting means controls an image adjustment value for said second image;

said image adjusting means provides at least one of a function to reduce the image adjustment value for said second image when said first sound is reproduced for at least a second predetermined time, and to return said image adjustment value to an original value when i) said first sound is continuously reproduced, and ii) said image adjustment value for said second image is concurrently in a reduced state.

13. An image display device comprising:

image and sound reproducing means for reproducing at least one of an image and sound, wherein said image and sound reproducing means includes first image and sound reproducing means for reproducing one of a first image and a first sound and second image and sound reproducing means for reproducing a second image and a second sound;

display means for displaying a selected one of said first or second image;

deterioration prevention means for preventing deterioration of said image and sound reproducing means by selectively providing power to said image and sound reproducing means based on a signal source of said display means;

wherein said first image and sound reproducing means is a digital versatile disk (DVD) player;

said second image and sound reproducing means is a television receiver;

said protective means provides at least one of a function to,
(1) discontinues reproduction of said first image and sound reproducing means;
(2) deactivate said first image and sound reproducing means at a second predetermined time after said second image and sound reproducing device is activated while said first image is displayed by said display means;

wherein said first image and sound reproducing means reproduces only said first sound;

said screen burn-in prevention means is provided with image adjusting means for adjusting a condition of an image on the screen;

said image adjusting means controls an image adjustment value for said second image;

said image adjusting means provides at least one of a function, to reduce the image adjustment value for said second image when said first sound is reproduced for at least a third predetermined time, and to return said image adjustment value to an original value when i) said first sound is continuously reproduced, and ii) said image adjustment value for said second image is concurrently in a reduced state.

14. An image display device comprising:

image and sound reproducing means for reproducing at least one of an image and sound, said image and sound reproducing means includes first image and sound reproducing means for reproducing one of a first image and a first sound and second image and sound reproducing means for reproducing a second image and a second sound, display means for displaying a selected one of said first or second image;

deterioration prevention means for preventing deterioration of said image and sound reproducing means by selectively providing power to said image and sound reproducing means based on a signal source of said display means;

wherein said first image and sound reproducing means is a compact disk (CD) player;

said first image and sound reproducing means reproduces only said first sound;

said display means is further provided with an on-screen display means; and said on-screen display means i) displays a warning on said display means indicating ongoing reproduction of said first sound when said first sound is reproduced, and ii) changes a position of said warning at a periodic time interval;

said screen burn-in prevention means is provided with image adjusting means for adjusting a condition of an image on the screen;

said image adjusting means controls an image adjustment value for said second image;

said image adjusting means provides at least one of a function, to reduce the image adjustment value for said second image when said first sound is reproduced for at least a first predetermined time, and to return said image adjustment value to an original value when i) said first sound is continuously reproduced, and ii) said image adjustment value for said second image is concurrently in a reduced state.

15. An image display device comprising:

image and sound reproducing means for reproducing at least one of an image and sound, said image and sound reproducing means includes first image and sound reproducing means for reproducing one of a first image and a first sound and second image and sound reproducing means for reproducing a second image and a second sound;

display means for displaying a selected one of said first or second image;

deterioration prevention means for preventing deterioration of said image and sound reproducing means by selectively providing power to said image and sound reproducing means based on a signal source of said display means, said first image and sound reproducing means is a digital versatile disk (DVD) player;

said second image and sound reproducing means is a television receiver;

said screen burn prevention means provides at least one of a function to,
(1) discontinues reproduction of said first image and sound reproducing means;
(2) deactivate said first image and sound reproducing means,
when said first image remains unchanged for at least a first predetermined time;

said protective means provides at least one of a function to,
(1) discontinues reproduction of said first image and sound reproducing means;
(2) deactivate said first image and sound reproducing means;

at a second predetermined time after said second image and sound reproducing means is activated while said first image is displayed by said display means;

wherein said first image and sound reproducing means reproduces only said first sound;

said screen burn-in prevention means is provided with image adjusting means for adjusting a condition of an image on the screen;

said image adjusting means controls an image adjustment value for said second image;

said image adjusting means provides at least one of a function;

to reduce the image adjustment value for said second image when said first sound is reproduced for at least a third predetermined time, and to return said image adjustment value to an original value when i) said first sound is continuously reproduced, and ii) said image adjustment value for said second image is concurrently in a reduced state.

* * * * *

UNITED STATES PATENT AND TRADEMARK OFFICE
CERTIFICATE OF CORRECTION

PATENT NO. : 6,392,695 B1
DATED : May 21, 2002
INVENTOR(S) : Watamoto et al.

It is certified that error appears in the above-identified patent and that said Letters Patent is hereby corrected as shown below:

Column 15,
Line 19, delete the word "discontinues", and insert -- discontinue --.
Line 62, delete the word "and".

Column 16,
Line 36, delete the word "discontinues", and insert -- discontinue --.
Line 44, delete the word "discontinues", and insert -- discontinue --.

Signed and Sealed this

Thirty-first Day of December, 2002

JAMES E. ROGAN
*Director of the United States Patent and Trademark Office*